No. 750,716. PATENTED JAN. 26, 1904.
A. T. SMITH.
ELECTRIC FAN.
APPLICATION FILED AUG. 10, 1903.
NO MODEL.

Witnesses
C. P. Goepel
Henry J. Suhrbier

Inventor
Adolph T. Smith
By his Attorneys
Gower Niles

No. 750,716. Patented January 26, 1904.

UNITED STATES PATENT OFFICE.

ADOLPH T. SMITH, OF NEW YORK, N. Y., ASSIGNOR OF ONE-HALF TO MYRON B. MATTHEWS, OF PASSAIC, NEW JERSEY.

ELECTRIC FAN.

SPECIFICATION forming part of Letters Patent No. 750,716, dated January 26, 1904.

Application filed August 10, 1903. Serial No. 168,883. (No model.)

*To all whom it may concern:*

Be it known that I, ADOLPH T. SMITH, a citizen of the United States, residing in New York, borough of Manhattan, and State of New York, have invented certain new and useful Improvements in Electric Fans, of which the following is a specification.

This invention relates to electric fans in which the fan rotated by the armature of the electromotor is arranged horizontally instead of vertically, so as to produce a distribution of air in a horizontal plane to the direction of the axis of the fan.

One of the objections to the electric fans heretofore in use is that the body of air thrown by the fan in the direction of the axis of the fan is annoying to those directly in the draft produced by the fan, inasmuch as too intense agitation of air and cooling action is produced. This is especially noticeable and injurious to overheated persons. By moving the fan through a horizontal plane while rotating the same these objectionable features attendant cooling-fans may be obviated. Even this, however, furnishes only a partial relief.

The object of my invention is to place the fan in a horizontal position and incase the same in a casing that distributes the air in a horizontal plane, which is preferably so located as to be above the heads of the occupants of the room in which the fan is located, so that the fan keeps the air in motion and causes it to move in downward direction without the objectionable direct contact of the air in motion with the heads of the persons in the room; and for this purpose the invention consists of an electric fan the armature of which is arranged vertical and connected to a fan moving in a horizontal plane and inclosed in a casing provided with openings in its bottom, and an annular opening provided with radial wings near its top for the exit of the air in motion, said casing being constructed of a cylindrical lower portion and a conical top portion separated from each other by the annular opening and radial wings, so as to distribute the air in a horizontal plane in the room.

The invention consists, further, of heat-generating illuminating means or sources of heat supported below the fan-casing, so as to permit the use of the fan in winter for distributing heated air through the room.

Figure 1:
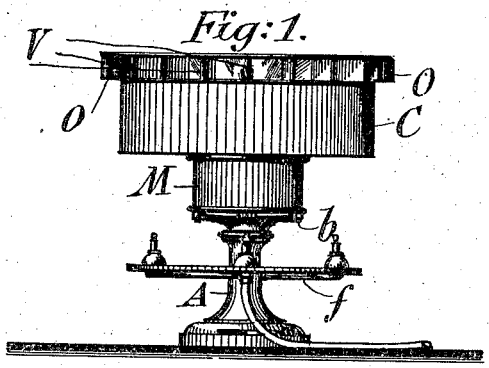
Figure 2:
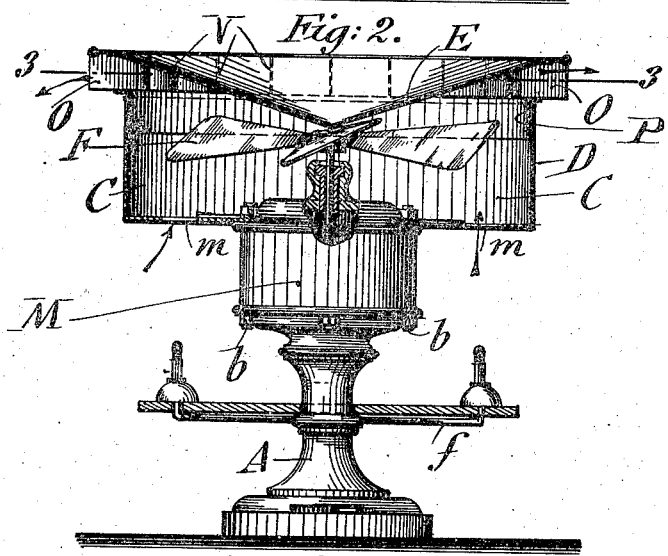
Figure 3:
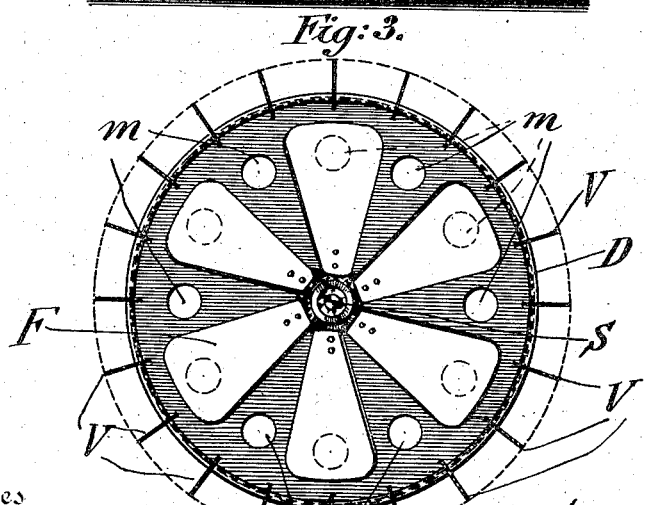

In the accompanying drawings, Figure 1 is a side elevation of my improved electric fan. Fig. 2 is a side elevation, partly in vertical section, drawn on a larger scale; and Fig. 3 is a horizontal section of the casing on line 3 3, Fig. 2.

Similar letters of reference indicate corresponding parts.

Referring to the drawings, A represents the supporting-stand of my improved electric fan. An electromotor M is supported by the stand in vertical position, so that the fan at the end of the armature-shaft is located in horizontal position. The fan F is surrounded by a casing C, the lower part D of which is of cylindrical shape, while the upper part E is made conical in shape, dishing in downward direction, so that its apex is in proximity to the shaft of the fan and in line with the axis of the fan. Between the cylindrical portion of the casing and the conical top is arranged an annular opening O, in which are arranged vanes V. For conveniently getting at the fan a concentric sleeve P is provided, which fits in the cylindrical portion D. To the sleeve P is fastened the vanes V, to which in turn the conical part is fastened. The sleeve P, vanes V, and conical top E form then a detached top. The bottom of the casing is provided with openings $m$, through which the air is drawn by the fan, after which it is thrown out in radial direction through the annular opening O and between the vanes V, so as to be distributed in a horizontal plane. The fan is preferably supported at such a height that the plane of rotation of the same is above the heads of the persons in the room, so that the air is uniformly distributed in a horizontal plane, forming a layer which gradually descends into the room, so as to freshen the air in the same without giving annoyance of the direct contact of the air with the heads of the persons in the room. The casing C is attached by suitable bolts $b$ to the supporting-stand A of the fan, as shown in Fig. 2.

To the lower part of the stand A are attached radial gas-arms $f$, with the gas-burners or other sources of heat, which when lighted generate heat which is drawn in through the openings *m* in the bottom of the casing and distributed through the radial wings or vanes V between the conical top and cylindrical bottom parts of the casing. In this manner the fan can not only be used during the summer season for agitating the air, and thereby exerting a cooling influence on the occupants of the room, but also in the winter season for the purpose of distributing heated air in the room in which the fan is located.

The improved fan can be used as a desk or bracket fan in the usual manner or as a ceiling-fan, in which case the fan and casing are placed in inverted position below the motor and its support.

I claim as new and desire to secure by Letters Patent—

1. An electric fan consisting of an electromotor, the shaft of which is vertically arranged, a fan rotated in a horizontal plane by said motor, a casing surrounding said fan and formed of a cylindrical lower part having openings in its bottom, a conical top part, and an annular opening between the lower part and top part, substantially as set forth.

2. An electric fan, consisting of an upright stand, an electromotor located in vertical position on the same, a fan rotated in a horizontal plane by said motor, a casing surrounding said fan and provided with bottom openings, and a conical top separated from the casing proper by distributing-vanes, substantially as set forth.

3. The combination, with an electric fan provided with a fan rotated in a horizontal plane, of a casing surrounding said fan and provided with bottom openings and outlets near its top so as to throw out the air in a horizontal plane, of gas-burners supported below the casing for heating the air thrown out by the fan, substantially as set forth.

In testimony that I claim the foregoing as my invention I have signed my name in presence of two subscribing witnesses.

ADOLPH T. SMITH.

Witnesses:
 PAUL GOEPEL,
 C. P. GOEPEL.